(No Model.) 3 Sheets—Sheet 1.
C. W. CRAMER.
MEASURING AND DISPENSING APPARATUS.
No. 594,196. Patented Nov. 23, 1897.
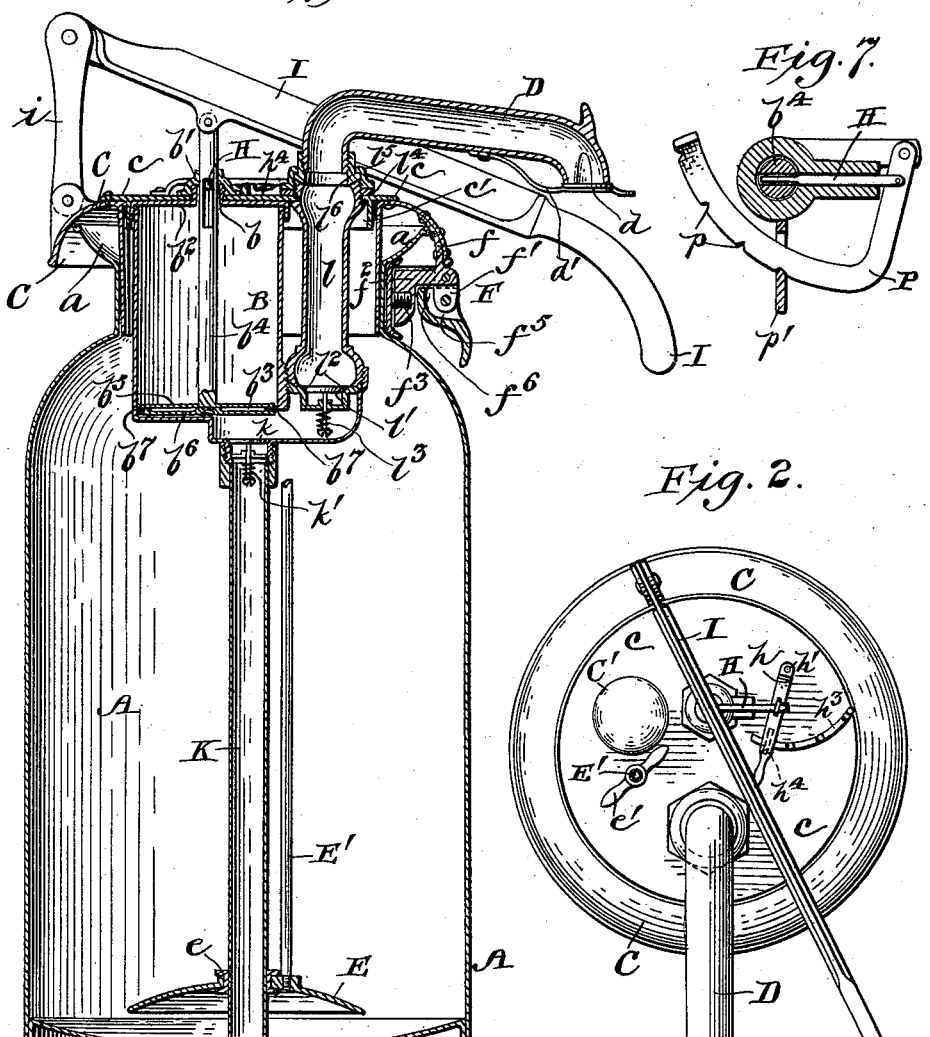
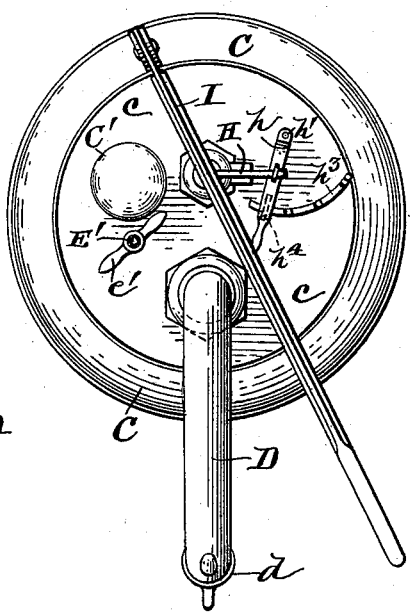
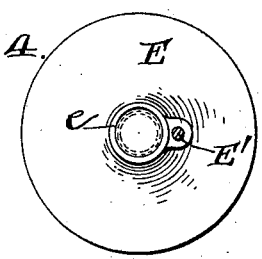
WITNESSES
INVENTOR (No Model.) 3 Sheets—Sheet 2.

C. W. CRAMER.
MEASURING AND DISPENSING APPARATUS.

No. 594,196. Patented Nov. 23, 1897.

WITNESSES
Severance
L. C. Royer

INVENTOR
Charles W. Cramer
by his Atty
Mason Fenwick Lawrence

THE NORRIS PETERS CO., PHOTO-LITHO., WASHINGTON, D. C.

(No Model.) 3 Sheets—Sheet 3.

C. W. CRAMER.
MEASURING AND DISPENSING APPARATUS.

No. 594,196. Patented Nov. 23, 1897.

WITNESSES
INVENTOR

UNITED STATES PATENT OFFICE.

CHARLES W. CRAMER, OF SCRANTON, PENNSYLVANIA.

MEASURING AND DISPENSING APPARATUS.

SPECIFICATION forming part of Letters Patent No. 594,196, dated November 23, 1897.

Application filed July 22, 1896. Serial No. 600,128. (No model.)

*To all whom it may concern:*

Be it known that I, CHARLES W. CRAMER, a citizen of the United States, residing at Scranton, in the county of Lackawanna and State of Pennsylvania, have invented certain new and useful Improvements in Liquid Measuring and Dispensing Apparatus; and I do hereby declare the following to be a full, clear, and exact description of the invention, such as will enable others skilled in the art to which it appertains to make and use the same.

My invention relates to improvements in liquid dispensing and measuring apparatus, and has more particular relation to such apparatus as is employed for measuring and dispensing milk.

The invention consists of certain novel constructions, combinations, and arrangements of parts, all of which will be hereinafter more particularly set forth and claimed.

Figure 3:
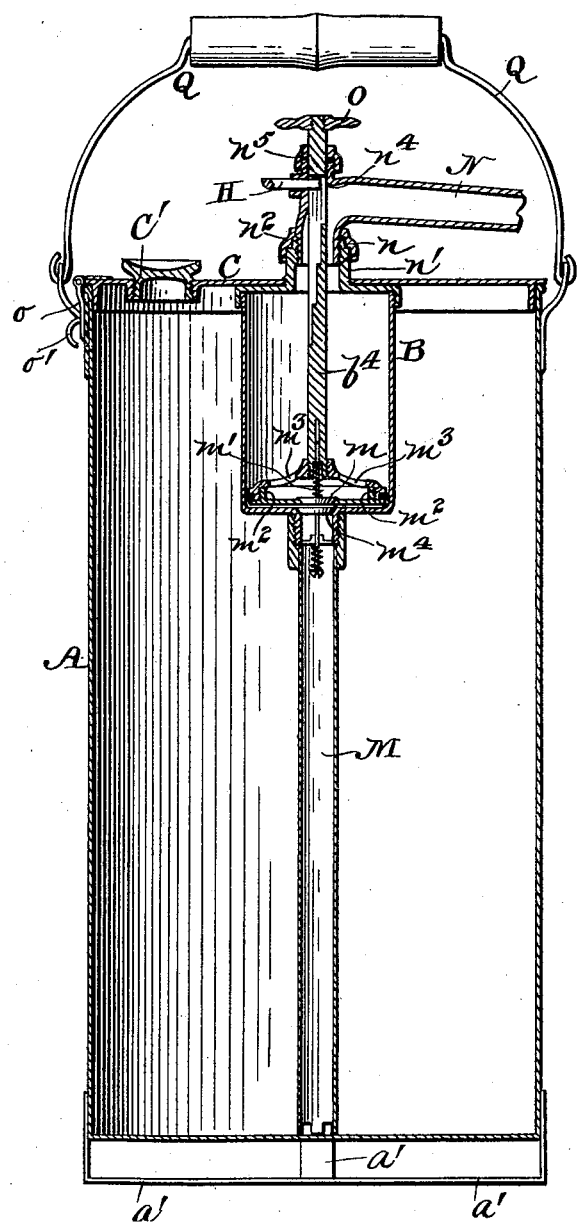
Figure 5:
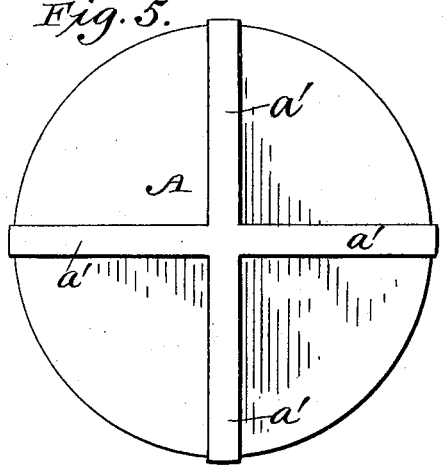
Figure 6:
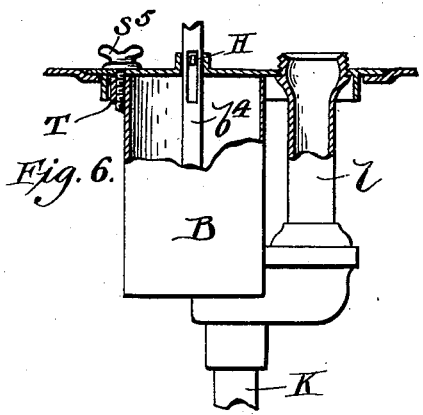
Figure 8:
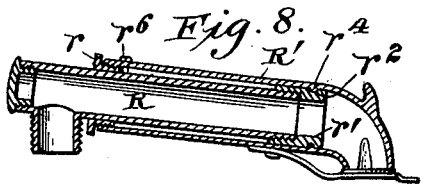
Figure 9:
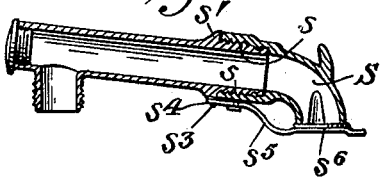
Figure 10:
Figure 11:
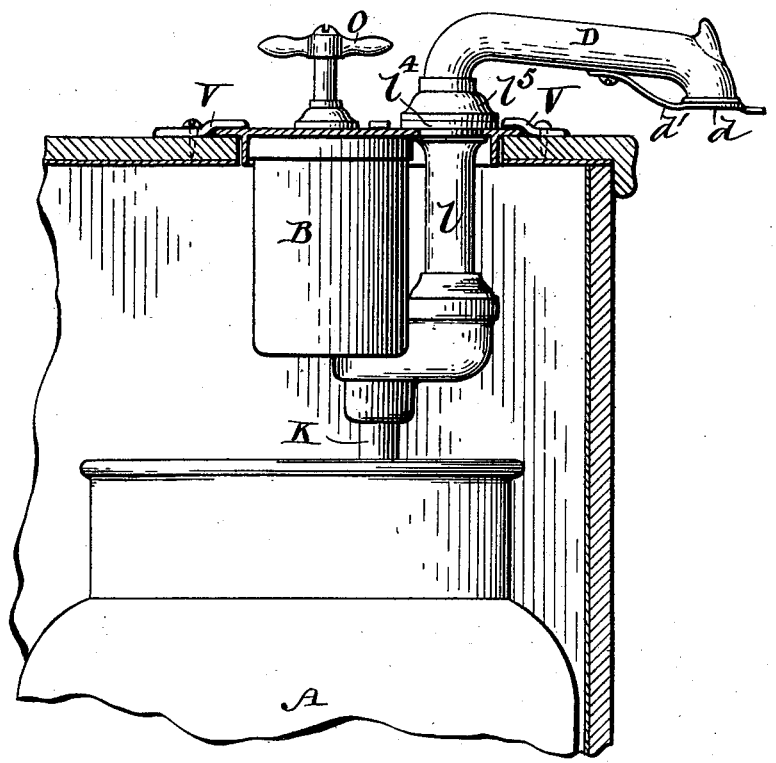
Figure 12:
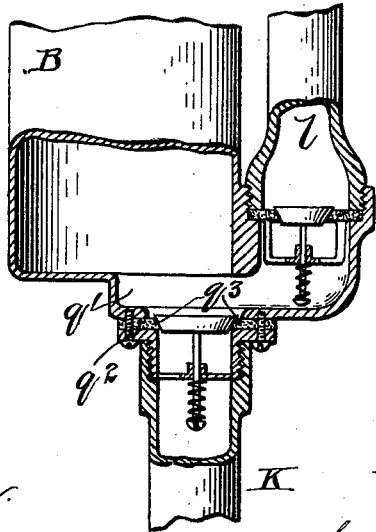

In the accompanying drawings, forming part of this specification, Figure 1 represents a central vertical section through the devices embodying my invention. Fig. 2 represents a top plan view of the same. Fig. 3 represents a modified form of my invention. Fig. 4 represents a top plan view of the agitator. Fig. 5 represents a bottom plan view of the devices shown in Fig. 3. Fig. 6 represents a detail central vertical section of the pump and a modified form of device for attaching it to the cover. Fig. 7 represents a detail top plan view of a modified form of adjusting stop-pin for the pump piston-rod. Fig. 8 represents a central vertical longitudinal section through a modified form of delivery-spout. Fig. 9 represents a central vertical longitudinal section through another form of adjustable spout. Fig. 10 represents a detail side elevation of the brush employed in connection with my apparatus for cleaning the same. Fig. 11 represents a broken detail vertical section of a portion of a refrigerator with my invention applied thereto. Fig. 12 represents a central vertical section through a modified form of valve-seating devices.

A in the drawings represents the can or receptacle to which my measuring and delivery apparatus is applied.

B represents the pump-cylinder; C, the cover to which it is attached; D, the delivery-spout, and E the agitator.

The can A is of any well-known and desirable form and is preferably provided with the usual flanged and flaring top rim $a$. The cap C is held upon the can by means of a clamping device F. This device comprises a plate $f$, secured to the inside of the cover and provided with two pendent spaced lugs $f'$ $f'$, between which is pivoted a clamping-block $f^2$. This block is provided upon its outer face with a clamping-plate which is adapted to fit the neck of the can and is provided with a screw-threaded stud $f^3$ upon its back for securing it to said clamping-block, so that it may be adjusted thereon to fit different-sized cans. The block $f^2$ is forced forward against the neck of the can by a cam-lever $f^5$, that is pivoted upon the lower ends of the lugs $f'$ $f'$. This cam is provided with a square corner $f^6$, which is adapted to cause the can to spring into place and lock itself against the clamping-block and thus hold the cover firmly upon the neck of the can. The cover C is provided at its center with an auxiliary cover $c$, secured thereto and having a pendent flange $c'$. The pump-cylinder B is secured to this latter cover by a hollow screw-threaded stud $b$, that passes through an aperture in the center of the auxiliary cover and is held in position by a hollow nut $b'$. The cylinder B is provided with a removable top $b^2$, a piston $b^3$, and a piston-rod $b^4$, connected to the latter and passing up and out through the top of the pump-cylinder and the auxiliary top. The piston $b^3$ comprises two spaced plates $b^5$ $b^6$, respectively, with a packing $b^7$ between them about their peripheries. These plates are held together by the lower screw-threaded end of the piston-rod, which passes through them. This piston-rod is slotted longitudinally in a stair-step fashion, as shown in Fig. 3, so that its movements may be limited by a catch-rod H, secured upon the top of the cover. This catch-rod is projected more or less into the slot in the piston-rod, so as to be engaged by the proper projection of the slot, by a lever $h$, that is pivoted to the top by a pin $h'$, that works through a slot in the same. The opposite end of the said lever is adapted to be secured in the desired notch in a segmental adjusting-rack $h^3$ by means of a bow-spring $h^4$, secured to the under side of the same and engaging the notches in the said rack. By means of this adjustment the action of the piston can be so regulated that it will take up and deliver only a certain quantity of the liquid, which has previously been determined by the position of the lever upon the segment. The piston-rod is connected at its upper end to an operating-lever I, that is pivotally mounted upon the cover of the can by a pivoted link $i$. A pendent tube K is attached to and communicates with the lower end of the pump-cylinder and extends to the bottom of the can. This tube is recessed at its bottom, so that although it may rest upon the bottom of the can it will still take up the liquid therein. The upper end of the tube is provided with an upwardly-opening valve $k$, that is normally kept seated by a spring $k'$. A delivery-tube $l$ is also connected to the lower part of the cylinder and is provided with an upwardly-opening valve $l'$, that is seated upon a ground seat $l^2$, which in turn is seated in the flaring end of the tube $l$ and held in position by the lower conical end of the upper portion of said tube $l$, said portion screwing into the lower portion and forcing said ground plate down upon its seat. The valve $l'$ is held normally down upon its seat by a spring $l^3$. The upper end of the vertical portion of the tube $l$ is secured in the cover of the can by means of two lock-nuts $l^4$ and $l^5$, respectively. The upper end of the said tube is provided with a conical seat, in which the lower conical end of a spout-receiving sleeve $l^6$ is secured. The spout D is adapted to screw into the screw-threads with which the upper end of the sleeve $l^6$ is provided. This spout is provided at its end with a cover $d$, held in position by a spring-clip $d'$, to prevent dirt or other foreign substances from entering the tube. The inverted-saucer-shaped agitator E is applied about the pendent tube K, so as to slide freely thereon, by means of a rubber sleeve $e$, a rod $E'$ being attached to said agitator and extending up and out of the cover of the can and provided with a handle $e'$, whereby it may be operated. This agitator prevents the milk and cream from separating, with a result of good milk being drawn from the can at the bottom, whereas if the milk were allowed to stand the cream would rise to the top, and the result would be that poor milk would be drawn from the bottom. A suitable covered aperture $c'$ is provided in the cover of the can for filling the same when desired.

In the modified form of my invention shown in Fig. 3 I have done away with the discharge-tube $l$ and draw the liquid directly through the cylinder.

In this application of my invention a pendent tube M is suitably attached to the bottom of the cylinder and communicates therewith. This tube is of similar construction with the tube shown in Fig. 1 and is provided with a similar spring-actuated upwardly-opening valve $m^4$. The piston in this case is provided with an upwardly-opening valve $m$, normally held down by a spring $m'$. The piston is substantially like that shown in Fig. 1, with the exception that the two parts are held together by screw-threaded flanges $m^2$ formed thereon. The upper portion of the piston is apertured at $m^3$ to allow the liquid to pass therethrough at this point. The delivery-spout N is attached to the upper end of the cylinder by a conical nut $n$, seated in a conical projection $n'$, formed on the cover of the cylinder, said nut being held in position by a binding-nut $n^2$ in a manner similar to the attachment of the spout in Fig. 1. The upper end of the piston-rod passes through an aperture $n^4$ in the top of the spout and is provided with a suitable packing $n^5$ for preventing the escape of the liquid at this point.

The can is provided at its bottom with cross-strips $a$, so attached thereto that the operator's foot can be placed thereon to keep the can firmly in position when the pump is being operated.

The can illustrated in Fig 3 is of slightly-different construction from that shown in Fig. 1, and its cover is attached thereto by suitable hasps and staples $o$ and $o'$, respectively.

In the form of my invention shown in Fig. 3 the piston-rod is operated by a handle O of the T-pattern attached to its upper end.

In the modified form of my stop-pin shown in Fig. 7 the pin is attached to an angular segmental lever P, that is notched about its periphery, as at $p$. This notched end of said lever works through a slot in a stop-plate $p'$, whereby any one of the notches may be sprung into engagement with the said plate and thus adjust the position of the pin and the quantity of liquid pumped.

In the modified form of spout shown in Fig. 8 the same is constructed in two parts R and R'. The part R is attached to the pump-cylinder in the described manner, while the part R' slides upon the said part R, packing-nuts $r$ and $r'$ being attached to the respective parts by screw-threads. The nut $r'$ is provided with peripheral recesses $r^2$, into which are sprung teats $r^4$, formed on the inner surface of the longitudinally-movable part R', to hold the spout in its closed position. A screw $r^6$ is provided in part R' to lock the two parts in their adjusted positions. It will be observed from the above that the spout may be extended at will in a telescopic manner.

In the modified form of the spout shown in Fig. 9 I have provided a rotatable mouthpiece S, that is adapted to be turned up to prevent the spout from dripping. This mouthpiece is screw-threaded and is adapted to be screwed upon screw-threads $s$, formed on the spout proper, and abut against an annular shoulder $s'$, also formed thereon. Notches $s^3$ are formed in said annular shoulder and are adapted to be engaged by the extended end $s^4$ of the spring $s^5$, that supports the spout-cover $s^6$.

In Fig. 6 I have shown the pump-cylinder attached to the cover by means of a screw-threaded lug T, integral therewith and engaged by a thumb-bolt $s^5$, whereby it is secured in position.

It will be observed from the above that when the piston is drawn up the liquid in the can rises through the pendent tube, and as the piston is forced downward is forced out through the delivery-spout. The exact amount desired is secured by limiting the upward movement of the piston by means of the adjustable stop-pin, the farther the pin being moved in the less the movement will be, and vice versa.

A suitable bail Q can be applied to the can for carrying the same.

It will be observed that all the several parts may be taken to pieces to permit a thorough scouring of the same and as readily put together again. To assist in this cleaning operation, I have provided a circular brush U, Fig. 10, having a screw-threaded socket adapted to receive the end of the rod E' when it is removed from the agitator. The brush when thus applied to the rod is employed for cleaning the tubes.

The joints between the ground valve-seat and the delivery-tube may be made flat and packed with a suitable packing $q$, Fig. 12, any good and well-known packing being employed.

The T-handle for operating the piston or the agitator may be used in any of the modified forms of my invention. In this case the annular supporting-recess $q'$ for the flat seat is formed with an outwardly and downwardly inclined bottom, which prevents the valve-seat from pressing in upon the valve when pressure is applied from above upon said seat. The joint between the cylinder and the pendent tube, as shown in this figure, is also provided with a flat valve-seat $q^2$ and packing $q^3$, the whole being secured together by screws.

It is sometimes desirable to apply my invention to a refrigerator. In such cases I employ buttons V, such as shown in Fig. 11, to secure the top of the pump-cylinder in the top of the refrigerator.

The discharge end of the delivery-spout is provided with the usual air-vent, so that the liquid will flow freely therefrom.

Having now described my invention, what I claim as new, and desire to secure by Letters Patent, is—

1. The combination of a liquid measuring and dispensing apparatus, comprising a liquid-containing vessel, a pump mounted in the same, a piston-rod connected to said pump and having a slot therein provided with stair-step projections, an adjustable pin projecting into said slot and limiting the movement of the piston-rod according to its adjustment in or out, a tube pendent from said pump into the body of the vessel, means for operating the piston and a delivery-spout passing through the top of the vessel and connected to the pump, an agitator comprising a concaved disk mounted on the pendent tube and guided thereby and a rod independent of the said pump, operating means for operating said agitator whereby the contents of the vessel may be agitated as much as desired without operating the pump, substantially as described.

2. In a liquid measuring and dispensing apparatus, the combination with a liquid vessel, a pump mounted in the same, a piston-rod connected to said pump and having a slot therein provided with stair-step projections, an adjustable pin projecting into said slot and limiting the movement of the piston-rod according to its adjustment in or out, and a delivery-spout connected to the pump, substantially as described.

3. In a liquid measuring and dispensing apparatus, the combination with a liquid-containing vessel, a pump located therein, a tube pendent from the said pump into the body of the vessel, a piston-rod connected to said pump, a handle for operating said rod, means for positively limiting the upward movement of said rod, said means being adjustable in and out to a greater or less extent at right angles to the movement of the piston-rod for regulating the stroke of the piston and consequently the amount of liquid delivered, and a delivery-spout connected to said pump, substantially as described.

4. In a liquid measuring and dispensing apparatus, the combination with a liquid-containing vessel, a pump mounted within the same, a piston-rod moving in said pump and having a slot provided with engaging shoulders, a rod adapted to engage said shoulders, means for adjusting said rod in or out to a greater or less degree at right angles to the movement of said piston-rod so as to pump only the desired quantity, a lever for operating said pump, and a delivery-spout connected to said pump, substantially as described.

5. In a liquid measuring and dispensing apparatus, the combination with a liquid-containing vessel, a cover for the same, a pump attached to said cover, a tube pendent from said pump into the body of the vessel, a piston-rod connected to said pump, having a slot provided with engaging shoulders and a rod adapted to engage said shoulders for positively limiting the movement of said piston and adjusting means for moving said rod at right angles to the movement of the piston-rod predetermined distances to gage the quantity of liquid delivered, and a delivery-spout connected to said pump, substantially as described.

6. In a liquid measuring and dispensing apparatus, the combination with a liquid-containing vessel, a pump located within the same, means for operating said pump and a delivery-spout connected to said pump and having a rotatable discharging end portion adapted to be turned up to prevent all dripping after the device is used each time and retaining means for holding said discharging end in its adjusted position, substantially as described.

7. In a liquid measuring and dispensing apparatus, the combination with a pump-cylinder, a cover for the same and bracket-bolts adapted to be secured in the cover and support the pump and thumb-nuts for tightening the bolts in the cover, substantially as described.

8. In a liquid measuring and dispensing apparatus, the combination with a liquid-containing vessel having a flaring mouth portion, of a cover for the same, a pump attached to said cover, a pendent tube connected to the pump and extending into the body of the vessel, a valve-chamber interposed between said pendent tube and the cylinder, valves controlling the inlet and outlet to said chamber, a delivery-spout also secured to said cover and a tube connecting said spout with the valve-chamber and hand-operated means for engaging the said flaring mouth portion of the liquid-containing vessel and wedging said cover tightly in position, substantially as described.

In testimony whereof I hereunto affix my signature in presence of two witnesses.

CHARLES W. CRAMER.

Witnesses:
WM. CONRAD,
F. E. ROESLER.